United States Patent [19]

Jones et al.

[11] Patent Number: 4,880,584
[45] Date of Patent: Nov. 14, 1989

[54] FIBER REINFORCED THERMOPLASTIC RESIN MATRIX COMPOSITES

[75] Inventors: Robert J. Jones, Torrance; Glenn E. C. Chang, Redondo Beach, both of Calif.

[73] Assignee: TRW, Inc., Redondo Beach, Calif.

[21] Appl. No.: 223,613

[22] Filed: Jul. 25, 1988

Related U.S. Application Data

[62] Division of Ser. No. 855,939, Apr. 25, 1986.

[51] Int. Cl.$^4$ ............................................. B29C 43/20
[52] U.S. Cl. .................................. 264/135; 264/136; 264/258; 264/331.19; 264/236; 428/473.5
[58] Field of Search ...................... 264/258, 40.5, 234, 264/236, 237, 319, 324, 345, 346, 347, 348, 135, 136, 331.19; 428/473.5

[56] References Cited

U.S. PATENT DOCUMENTS

| | | | |
|---|---|---|---|
| 3,356,648 | 12/1967 | Rogers | 528/353 |
| 3,542,735 | 11/1970 | Lynch | 528/126 |
| 3,573,132 | 3/1971 | Ducloux et al. | 156/307.3 |
| 3,699,075 | 10/1972 | Lubowitz | 528/172 |
| 3,745,149 | 7/1973 | Serafini et al. | 528/288 |
| 3,748,311 | 7/1973 | Burns et al. | 528/336 |
| 3,761,453 | 9/1973 | Jones | 525/419 |
| 3,772,254 | 11/1973 | Jones et al. | 528/80 |
| 3,792,022 | 2/1974 | Jones | 525/123 |
| 3,812,159 | 5/1974 | Lubowitz | 528/172 |
| 3,926,913 | 12/1975 | Jones et al. | 525/421 |
| 3,951,902 | 4/1976 | Jones et al. | 524/430 |
| 3,959,350 | 5/1976 | Rogers | 524/600 |
| 3,965,125 | 6/1976 | Meyers | 544/319 |
| 3,975,363 | 8/1976 | Jones | 526/259 |
| 3,988,303 | 10/1976 | Korshak et al. | 528/183 |
| 4,100,138 | 7/1978 | Bilow et al. | 428/435 |
| 4,111,906 | 9/1978 | Jones et al. | 528/185 |
| 4,116,937 | 9/1978 | Jones et al. | 427/221 |
| 4,173,700 | 11/1979 | Green et al. | 528/125 |
| 4,196,277 | 4/1980 | Jones et al. | 528/570 |
| 4,203,922 | 5/1980 | Jones et al. | 528/185 |
| 4,237,262 | 12/1980 | Jones | 528/322 |
| 4,244,853 | 1/1981 | Serafini et al. | 260/33.409 |
| 4,269,968 | 5/1981 | Duran et al. | 528/125 |
| 4,273,916 | 6/1981 | Jones | 428/413 |
| 4,283,521 | 8/1981 | Jones | 428/413 |
| 4,350,741 | 9/1982 | Hasegawa et al. | 264/105 |
| 4,440,643 | 4/1984 | Makino et al. | 210/500.28 |
| 4,470,944 | 9/1984 | Asakura et al. | 264/178 R |
| 4,477,648 | 10/1984 | Jones et al. | 528/185 |
| 4,521,623 | 6/1985 | Jones et al. | 564/315 |
| 4,522,880 | 6/1985 | Klostermeier et al. | 156/244.11 |
| 4,528,004 | 7/1985 | Makino et al. | 55/158 |
| 4,528,216 | 7/1985 | Ogura et al. | 427/387 |
| 4,532,275 | 7/1985 | Aito et al. | 523/468 |
| 4,533,574 | 8/1985 | Fryd et al. | 427/385.5 |
| 4,535,101 | 8/1985 | Lee et al. | 521/189 |
| 4,543,295 | 9/1985 | St. Clair et al. | 156/307.7 |
| 4,562,100 | 12/1985 | Fryd et al. | 427/385.5 |
| 4,765,942 | 8/1988 | Christensen | 264/510 |

FOREIGN PATENT DOCUMENTS

0134973 3/1985 European Pat. Off.
0150931 1/1988 European Pat. Off.

OTHER PUBLICATIONS

Undated Brochure entitled "NR-150 Polyimide Composites", (14 pages plus 8 pages of tables and figures).
Paper entitled "371° C. Mechanical Properties of Graphite/Polyimide Composites", by Peter Delvigs.
Brochure entitled Product Data–Thermid FA-700, (7 pages including tables and graphs).
Journal of Applied Polymer Science, Applied Polymer Symposium, vol. 35, pp. 207-222, (Published in 1979); Entitled: "Long-Term Properties of Polymers and Polymeric Materials".
Published Patent Application NASA Case No. LE-W-12,876-2, (Ser. No. 393,583, filed Jun. 30, 1982), No. N83-29392.
Chamis et al., NASA Technical Memorandum NASA TM X 67802 (Apr. 20-22, 1971).

(List continued on next page.)

*Primary Examiner*—Jay H. Woo
*Assistant Examiner*—Jeremiah F. Durkin, II
*Attorney, Agent, or Firm*—John F. Sieberth; Richard J. Hammond

[57] ABSTRACT

Polyimide polymer composites having a combination of enhanced thermal and mechanical properties even when subjected to service temperatures as high as 700° F. are described. They comprise (a) from 10 to 50 parts by weight of a thermoplastic polyimide resin prepared from 2,2-bis[4-(4-aminophenoxy)phenyl]hexafluoropropane and (b) from 90 to 50 parts by weight of continuous reinforcing fibers, the total of (a) and (b) being 100 parts by weight. Composites based on polyimide resin formed from 2,2-bis[4-(4-aminophenoxy)phenyl]hexafluoropropane and pyromellitic dianhydride and continuous carbon fibers retained at least about 50% of their room temperature shear strength after exposure to 700° F. for a period of 16 hours in flowing air. Preferably, the thermoplastic polyimide resin is formed in situ in the composite material by thermal imidization of a corresponding amide-acid polymer prepared from 2,2-bis[4-(4-aminophenoxy)phenyl]hexafluoropropane. It is also preferred to initially size the continuous reinforcing fibers with up to about one percent by weight of an amide-acid polymer prepared from 2,2-bis[4-(4-aminophenoxy)phenyl]hexafluoropropane. In this way imidization at a suitable elevated temperature results in the in-situ formation of a substantially homogeneous thermoplastic matrix of the polyimide resin tightly and intimately bonded to the continuous fibers. The resultant composites tend to have optimum thermo-mechanical properties.

6 Claims, No Drawings

OTHER PUBLICATIONS

Serafini et al., NASA Technical Memorandum NASA TM X-67803 (Apr. 6-7, 1971).
Serafini et al., Journal of Applied Polymer Science, vol. 16, pp. 905-915 (1972).
Serafini et al., NASA Technical Note NASA TN D-6611, Jan. 1972.
Serafini et al., Applied Polymer Symposium No. 22, pp. 89-100 (1973).
Serafini et al., NASA Technical Memorandum 79039, (Apr. 1-6, 1979).
Serafini et al., NASA Technical Memorandum NASA TM X-71894 (Apr. 6-8, 1976).
Delvigs et al., NASA Technical Memorandum 79062 (May 8-10, 1979).
Delvigs et al., National SAMPE Symposium & Exhibition Proceedings, vol. 24, No. 2, pp. 1053-1068 (1979).
Serafini et al., NASA Technical Memorandum 82821 (May 4-6, 1982).
Serafini, NASA Technical Memorandum 83047 (Nov. 10-12, 1982).
Du Pont Brochure "Processing Guidelines for PI-2555 as Inter-layer Dielectric" (Dated 4/85).
Du Pont Brochure "Preliminary Information Bulletin Spin Coating Techniques"-dated 5/85.
Du Pont Brochure "PI-2540"-dated 5/85.
Du Pont Brochure "PI-2545"-dated 5/85.
Du Pont Brochure "PI-2556"-dated 5/85.
Du Pont Brochure "PI-2560"-dated 5/85.
Du Pont Brochure on "Procedure for Dispensing PYRALIN ® PI-2560 & PI-2562"-5/85.
Du Pont Brochure on "Semiconductor Grade Products"-dated 12/85.
Du Pont Brochure on "PI-2566"-dated 12/85.
Du Pont Brochure on "PYRALIN ® SP PI-2570-D'-'-dated 4/86.
Du Pont Brochure on "PYRALIN ® SP PI-2575-D'-'-dated 4/86.
Du Pont Brochure on "PYRALIN ® LTP-PI-2590-"-dated 4/86.
Du Pont Brochure on "PYRALIN ® PD-PI-2701-D'-'-dated 4/86.
Du Pont Brochure on "VM-651 Adhesion Promoter'-'-dated 4/86.
Du Pont Brochure on "PYRALIN ® PD PI-2702-D'-'-dated 5/86.
Du Pont Brochure on "PI-2550"-dated 6/86.
Du Pont Brochure on "PI-2555"-dated 6/86.
Du Pont Brochure on "PYRALIN ® PI-2556"-dated 6/86.
Du Pont Brochure on "PI-2562"-dated 6/86.
Du Pont Brochure on "Product Specification T-9039 Thinner" dated 6/86.
Du Pont Brochure on "Test Methods for Product Specifications" dated 6/86.
"THERMID ® Polyimides", Brochure of National Starch and Chemical Corporation (Undated).
"Probimide TM 200 Series Soluble Polyimides for Microelectronics" Brochure of Ciba-Geigy Corporation (Undated).

FIBER REINFORCED THERMOPLASTIC RESIN MATRIX COMPOSITES

PROPERTY RIGHTS

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This application is a division application Ser. No. 855,939, filed Apr. 25, 1986.

TECHNICAL FIELD

This invention relates to novel and eminently useful fiber reinforced thermoplastic resin matrix composites and their production.

BACKGROUND

Graphite and carbon fiber reinforced resin matrix composites are finding increased use in many military and industrial applications. The significant benefit of resin matrix composites (or laminates) is weight savings in structures and systems over those fabricated from reinforced or non-reinforced metallic and ceramic materials without sacrifice of mechanical strengths. The weight savings equate directly to increased energy efficiency and payload capabilities. Composites are used today in many primary airframe, missile, spacecraft and vehicular structures, to cite a few applications.

A desire in the evolution and development of advanced fiber reinforced composites has been to apply these materials in increasingly hostile thermal environments. A secondary goal has been to increase the inherent impact strength of composite materials without sacrificing their other desirable characteristics and properties. In general, increased thermal stability is gained by incorporating a significant aromatic and heterocyclic content into the matrix resin structure and increased impact strength is gained by using thermoplastic matrix resins instead of thermosetting materials.

Significant improvements in the thermal stability of thermosetting composite matrix resin materials have been described by NASA in U.S. Pat. No. 3,745,149 for norbornene terminated polyimides and by Hughes Aircraft Company in U.S. Pat. No. 4,100,138 for ethynyl terminated polyimides. These thermosetting polyimide matrix resins are now used in primary structural applications where thousands of hours mechanical strength integrity retention at 500° F. to 600° F. in air is required. However, because these matrix resins are thermosetting when fully cured, their impact strengths, in general, and ability to resist severe microcracking on thermal cycling, in particular, are suspect.

In our U.S. Pat. Nos. 4,477,648 and 4,521,623 we have pointed out that a linear condensation polyimide based upon a reaction of four-ring aromatic diamine, 2,2-bis[(4-aminophenoxy)phenyl]hexafluoropropane, and pyromellitic dianhydride, as described in U.S. Pat. No. 4,111,906 to one of us, possessed promise as a matrix resin for use in jet compressor stage stator bushings at 675° F. use temperature. However, the critical temperature increase from 675° F. to 700° F. required for the new generation of advanced aircraft engines deleteriously affects the performance of this polyimide. The only other known resin which was thought to have equal or higher promise at these high temperatures was a resin once marketed by duPont as NR-150B. This was a linear condensation polyimide based upon single ring aromatic diamines and 4,4'-(hexafluoroisopropylidene)-diphthalic anhydride as described in U.S. Pat. No. 3,356,648. This resin, however, is no longer commercially available.

The approach taken in our U.S. Pat. Nos. 4,477,648 and 4,521,623 in our quest for polymer systems suitable for use at 700° F. (644° K.) in air at pressures up to 10 atmospheres involved provision of a polyimide made from 2,2-bis[[2-halo-4-aminophenoxy)phenyl]hexafluoropropane where the attached ortho halogen is preferably chlorine. A polyimide made from 2,2-bis[(2-chloro-4-aminophenoxy)phenyl]hexafluoropropane and 4,4'-(hexafluoroisopropylidene)diphthalic anhydride was found to have exceptional high temperature performance. Unfortunately, this polymer is quite expensive as it requires use of a pair of relatively expensive monomers for its synthesis.

THE INVENTION

Despite the prior findings and indications that polyimides of the type described in U.S. Pat. No. 4,111,906 are not suited for service at 700° F., a way has now been found by which it is possible to make effective use of such polymers for service at 700° F. Pursuant to this invention composites based on such polyimide polymers are provided having a combination of enhanced thermal and mechanical properties even when subjected to service temperatures as high as 700° F., by virtue of the presence therein of continuous fiber-reinforcement.

The composites of this invention are fiber-reinforced composite materials comprising (a) from 10 to 50 parts by weight of a thermoplastic polyimide resin prepared from 2,2-bis[4-(4-aminophenoxy)phenyl]hexafluoropropane and (b) from 90 to 50 parts by weight of continuous reinforcing fibers, the total of (a) and (b) being 100 parts by weight Pursuant to a preferred embodiment of this invention, the thermoplastic polyimide resin is formed in situ in the composite material by thermal imidization of a corresponding amide-acid polymer prepared from 2,2-bis[4-(4-aminophenoxy)phenyl]hexafluoropropane In another preferred embodiment of this invention, the continuous reinforcing fibers of the composites are initially sized with up to about one percent by weight of an amide-acid polymer prepared from 2,2-bis[4-(4-aminophenoxy)phenyl]hexafluoropropane. While the polyimide resin formed from the amide-acid polyimide precursor used in the pre-sizing step may differ from the polyimide formed or used as the thermoplastic component (a) of the composites, it is preferable that these materials be the same To illustrate, it is preferred to pre-size or pre-coat the continuous reinforcing fibers with an acid-amide polymer prepared for example from 2,2-bis[4-(4-aminophenoxy)phenyl]hexafluoropropane and pyromellitic dianhydride and thereafter to impregnate the pre-sized fibers with the same or an analogous acid-amide polymer prepared from 2,2-bis[4-(4-aminophenoxy)phenyl]hexafluoropropane and pyromellitic dianhydride. In this way imidization at a suitable elevated temperature results in the in situ formation of a substantially homogeneous thermoplastic matrix of polyimide resin of 2,2-bis[4-(4-aminophenoxy)phenyl]-hexafluoropropane and pyromellitic dianhydride tightly and intimately bonded to the continuous fibers The resultant composites tend to have optimum thermo-mechanical properties.

The thermoplastic polyimide resins utilized pursuant to this invention are characterized by consisting essentially of recurring units of the formula:

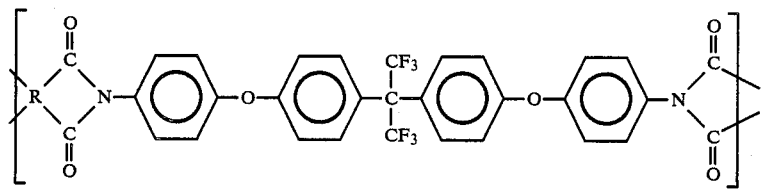

wherein R is an organic group of 5 to 22 carbon atoms which may be an aliphatic radical, including alicyclic, or an aromatic radical having one or more benzene rings or fused polynuclear rings. Polyimide polymers of this type and their synthesis are described in U.S. Pat. No. 4,111,906, all disclosure of which is incorporated herein by reference. Most preferably, R in the above formula is an aromatic group such as a benzene, biphenyl, or naphthalene group.

The amide-acid precursors of the above polyimide resins may be depicted by the following idealized formula in which R is as defined above:

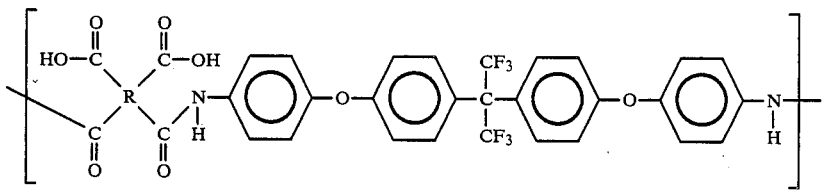

A wide variety of polycarboxylic acids, polycarboxylic acid esters, polycarboxylic acid halides, and dianhydrides may be used in producing thermoplastic polyimides of 2,2-bis[4-(4-aminophenoxy)phenyl]hexafluoropropane. U.S. Pat. No. 4,111,906 identifies a number of suitable materials for this use. Pyromellitic dianhydride is a particularly preferred comonomer for this use. Ordinarily the polyimide polymer will have an average molecular weight of at least about 10,000.

The thermoplastic polyimide resin may be preformed and then used in fabricating the composites of this invention. However, as noted above, it is preferable to produce the corresponding amide-acid polymer in the known manner (note for instance Example II of U.S. Pat. No. 4,111,906) and combine this material with the continuous reinforcing fiber (and, if desired, with other components such as antioxidants, thermal stabilizers, fire retardants, pigments, light stabilizers, fillers, and the like) to form a prepreg or precursor of the composite of this invention. The resultant prepreg is then heated to a suitable elevated temperature to cause imidization and in situ formation of the thermoplastic polyimide resin to occur.

Various types of continuous reinforcing fibers may be used in the composites of this invention. Among such suitable materials are carbon fibers, ceramic fibers, metal-coated or metal-containing graphite fibers, silicon carbide fiber, silicon nitride fiber, boron nitride fiber, and the like. The continuous fiber may be used in filamentary form or it may be employed in the form of a yarn or as a fabric of plain weave, satin weave, twill weave, basket weave, or the like. If desired, the composite structure may comprise parallel aligned continuous filaments extending along the maximum dimension of the structure, the fibers being bonded together with one or more of the above-depicted thermoplastic polyimide resins which intimately contacts substantially the whole of the surfaces of the filaments, the composite additionally containing a particulate filler such as talc, mica, wollastinite, titania, metal powder, graphite, powdered glass, or like substance.

As noted above, the composites of this invention should contain (a) from 10 to 50 parts by weight of a thermoplastic polyimide resin prepared from 2,2-bis[4-(4-aminophenoxy)phenyl]hexafluoropropane and (b) from 90 to 50 parts by weight of the continuous reinforcing fibers, the total of (a) and (b) being 100 parts by weight. If the content of the continuous reinforcing fibers is above about 90 parts by weight per hundred parts of (a) and (b), the fixing of the fibers in the matrix tends to be insufficient and formation of voids is likely to occur. On the other hand, if the content of the continuous reinforcing fibers is below about 50 parts by weight per hundred parts of (a) and (b), the resultant composite tends not possess the enhanced thermo-mechanical properties made possible in accordance with this invention. For best results, the composites will generally contain from about 30 to about 45 parts by weight of (a) and from about 70 to about 55 parts by weight of (b), the total of (a) and (b) being 100.

The composite material of this invention may be in the form of a sheet or planar laminate, or it may be in the form of a three-dimensional shaped article suitable for ultimate uses. The sheet-like fiber-reinforced composite can be formed most advantageously by impregnating or coating the continuous fiber substrate with the amide-acid precursor of the thermoplastic polyimide resin to form a prepreg. The prepreg is then heated to a suitable elevated temperature to cause imidization to occur whereby the thermoplastic polyimide resin is formed in situ in the prepreg. Laminated structures are readily produced by stacking a suitable number of plies of the prepreg in a compression mold and then applying heat and pressure, usually in stagewise fashion, to the resultant prepreg lay-up to effect lamination. Three-dimensional shaped articles may be formed in a similar fashion by use of suitably shaped molds. Operations such as impregnation, coating, mixing, lamination and molding are well-known to those skilled in the art and well-documented in the literature.

In producing the prepregs the thermoplastic polyimide or the amide-acid precursor thereof may be used in the form of a hot melt, a solution, an emulsion, a suspension, or etc. These materials may be applied to or impregnated into the base material of continuous fiber reinforcement by means of dipping, spraying, immersion, hand-laying, or use of typical coaters such as a bar coater, a roll coater, a doctor knife, or the like.

The practice and advantages of this invention will be still further apparent from the following illustrative examples.

EXAMPLE I

Polymer Production

In a flame-dried 100-mL 4-necked resin kettle equipped with an overhead stirrer and gas inlet adapter was dissolved 10g of 2,2-bis[4-(4-aminophenoxy)-phenyl]hexafluoropropane (4-BDAF) in 40 g of dried dimethylsulfoxide (DMSO) under an argon atmosphere. Then 3.9 g of pyromellitic dianhydride (PMDA) was added portionwise over ca. 7 minutes (25% w/w solids content). After all the PMDA was added, the mixture became somewhat warm and viscous. The mild exotherm subsided after ca. 30 minutes, and the viscous amber-colored solution was stirred for 2 more hours, then decanted into a container.

The sample of the 25% w/w solution of the 4-BDAF/PMDA amide-acid polymer in DMSO was placed in an aluminum dish and put in a vacuum oven. Heating and partial vacuum was applied to remove the solvent, then increased to 200° C. and less than 1 mm Hg for 3 hours to effect imidization. The imidized resin sample was then post-cured in an air-circulating oven at 371° C. for 16 hours to yield a reddish-brown powdery thermoplastic polyimide polymer.

EXAMPLE II

Composite Production

An amide-acid polymer sample of 4-BDAF/PMDA prepared in a similar manner to that described in Example I was used to impregnate Celion 12000 filament count carbon fiber sized with 0.7% by weight 4-BDAF/PMDA. A 400 g quantity of 4-BDAF/PMDA amide-acid polymer was solution coated from a methyl ethyl ketone diluted DMSO solution onto 600g of Celion fiber to give unidirectional continuous fiber reinforced prepreg consisting of 40% by weight resin. The prepreg was dried and imidized by heating at 200° C.

This Celion/4-BDAF/PMDA prepreg was employed to fabricate composites as follows. The prepreg was cut into rectangular pieces of 8 inches length×3 inches width and stacked to a nominal 0.10-inch thickness. Seven to eleven plies were required to attain the desired thickness, depending on the prepreg sample. The prepreg lay-up was placed in a match-die mold and compression molded by the following sequential process:

1. Stage at 400° F. with minimum contact pressure (less than 100 psia) for one hour.
2. Increase pressure to 1,000 psia and increase temperature to 730° F.
3. At 730° F., increase pressure to 3000 psia and increase temperature to 800° F.
4. Hold at 800° F. and 3000 psia for two hours.
5. Cool to 400° F. under 3000 psia pressure, then remove composite from mold.

The unidirectional composites prepared by this procedure were postcured unrestrained at 700° F. for 16 hours in flowing air. Representative thermo-mechanical properties of a representative post-cured Celion 12,000/4-BDAF/PMDA laminate are presented in the ensuing Table. The values shown each constitute the average of three data points.

TABLE

| Representative Thermo-mechanical Properties | | | | | |
|---|---|---|---|---|---|
| Short Beam Shear Strength (Ksi)[a] | | | Flexural Strength (Ksi)[b] | | |
| 75° F. | 700° F. | % Retention | 75° F. | 700° F. | % Retention |
| 5.7 | 2.9 | 50.9 | 87.1 | 42.7 | 49.0 |

[a]Determined at span ratio of 4:1
[b]Determined at span ratio of 16:1

It will be seen from the above data that the composites of this invention retained their mechanical properties to a substantial extent even after exposure to 700° F. in air for 16 hours. A corresponding representative post-cured laminate made from Celion 12,000 and a thermoplastic polyimide resin made from a 95:5 mole percent mixture of p-phenylene diamine:m-phenylene diamine and 2,2-bis-(3,4-dicarboxyphenyl)hexafluoropropane dianhydride (produced according to U. S. Pat. No. 3,356,648) exhibited retention values of 41.9% on short beam shear strength and 41.3% on flexural strength when subjected to the same test procedures.

Inasmuch as this invention is susceptible to considerable variation in its practice without departing from its true spirit, it is not intended that this invention be limited by the exemplifications presented herein. Rather, what is intended to be covered is as set forth in the ensuing claims.

We claim:

1. A process of forming a fiber-reinforced composite which comprises
   (a) forming a prepreg thermoplastic lay-up made of a stack of plies composed of a (i) thermoplastic polyimide resin prepared from the imidization of a polyamic acid of the formula

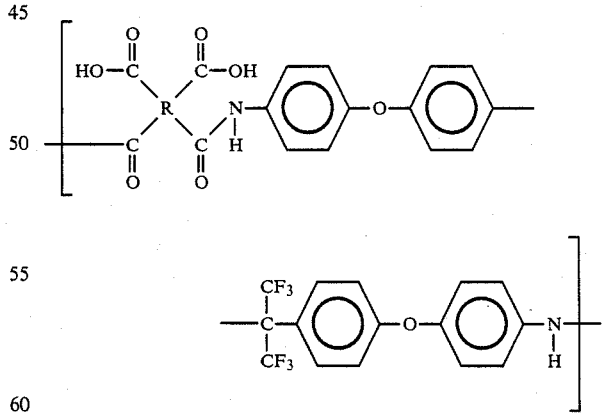

where R is an organic group of 5 to 22 carbon atoms which may be an aliphatic radical, including alicyclic, or an aromatic radical having one or more benzene or fused polynuclear rings and (ii) continuous reinforcing fibers, the composite having from 10 to 50 parts by weight of said resin and from 90 to 50 parts by weight of said fibers;

(b) compression molding said thermoplastic polyimide lay-up by applying thereto progressively increased pressure and temperature in stages;

(c) cooling said compression molded thermoplastic polyimide lay-up while under pressure;

(d) heating the lay-up resulting from step (c) while unrestrained in air at a temperature of at least 700° F.

2. A process of claim 1 further characterized in that the continuous reinforcing fibers in said prepreg lay-up are composed substantially of carbon fibers.

3. A process of claim 1 further characterized in that the thermoplastic polyimide resin in said prepreg lay-up is a thermoplastic polyimide resin prepared from 2,2-bis[4-(4-aminophenoxy)phenyl]hexafluoropropane and pyromellitic dianhydride.

4. A process of claim 1 still characterized by sizing the continuous reinforcing fiber with said polyimide prior to impregnating the fiber with the amide-acid polymeric precursor.

5. A process of claim 1, further characterized in that the plies of said stack of plies are produced by impregnating continuous reinforcing carbon fiber with an amide-acid polymeric polyimide precursor produced from 2,2-bis[4-(4-aminophenoxylphenyl]hexafluoropropane and pyromellitic dianhydride and heating the resultant prepreg to a temperature high enough to cause the amide-acid polymer to be imidized.

6. A process of claim 5 still further characterized by sizing the continous reinforcing fiber with a polyimide produced from 2,2-bis[4-(4-aminophenoxy)phenyl]hexafluoropropane and pyromellitic dianhydride and thereafter impregnating the sized fiber with said precursor.

* * * * *